Figure 1:
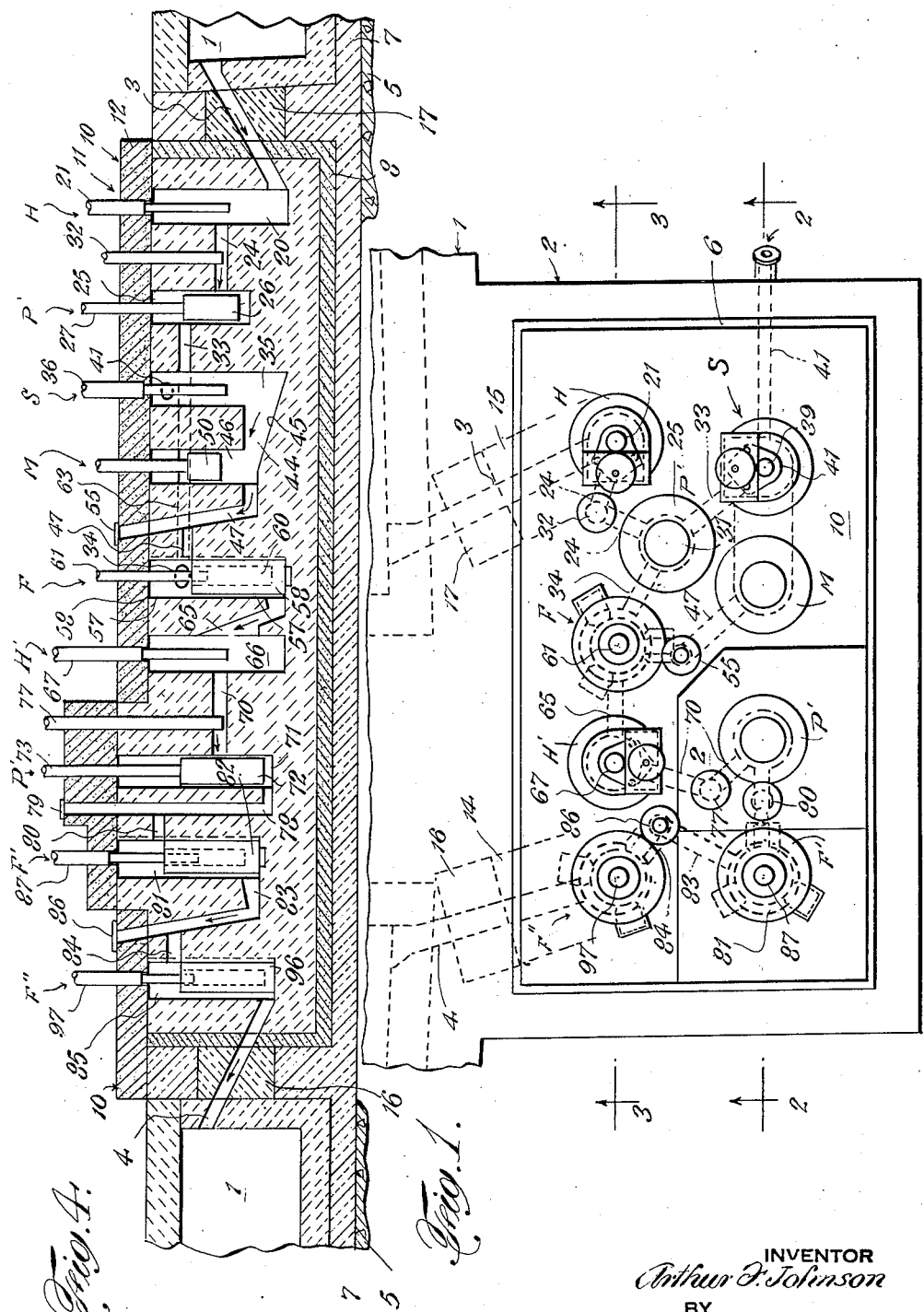

Oct. 19, 1948. A. F. JOHNSON 2,451,494
ENRICHING ALUMINA CONTENT OF CRYOLITE FUSIONS
Filed Jan. 28, 1947 2 Sheets-Sheet 1

INVENTOR
Arthur F. Johnson
BY
Pennie, Edmonds, Morton & Barrows
ATTORNEYS

Oct. 19, 1948.                    A. F. JOHNSON                    2,451,494
                    ENRICHING ALUMINA CONTENT OF CRYOLITE FUSIONS
Filed Jan. 28, 1947                                    2 Sheets-Sheet 2

INVENTOR
Arthur F. Johnson
BY
Pennie, Edmonds, Morton & Barrows
ATTORNEYS

Patented Oct. 19, 1948

2,451,494

UNITED STATES PATENT OFFICE 2,451,494

ENRICHING ALUMINA CONTENT OF CRYOLITE FUSIONS

Arthur F. Johnson, Longview, Wash., assignor to Reynolds Metals Company, Richmond, Va., a corporation of Delaware Application January 28, 1947, Serial No. 724,856

4 Claims. (Cl. 204—67)

This invention relates to enriching the alumina content of cryolite fusions in the electrolytic production of aluminum. The invention is especially concerned with the electrolytic reduction of fusions of alumina dissolved in cryolite and provides an improved apparatus and method for refining impure fusions of this character. My invention provides a method of, and apparatus for, passing alumina-depleted fusion from an electrolytic reduction operation to an alumina-enriching and purifying operation including the addition of impure bauxite containing oxidic impurities to the fusion and the reduction of iron oxide therefrom at a temperature above the melting point of iron, and the returning of alumina-enriched and purified fusion to the reduction operation while passing through one or more stages of filtration.

One of the important features of my invention is the provision of a bypass means for directing to the enriching and iron oxide reduction stage only a part of the alumina-depleted fusion, whereby only such part of the fusion is heated to the melting point of iron. The remainder of the alumina-depleted fusion is thereafter mixed with the enriched high temperature fusion to dilute the alumina and to decrease the temperature, giving the fusion properties suitable for electrolytic reduction. I prefer to introduce crude calcined bauxite containing such impurities as iron oxide, silica and titania in at least partially reduced condition together with a reducing agent including aluminum into the fusion, and to agitate the fusion by any suitable means to intermix the reducing agent therewith. I increase the temperature of the fusion being enriched, preferably by electric heating, to a temperature above the melting point of iron. At the temperatures employed I am able to effect an efficient reduction of iron oxide to molten iron and to dissolve up to as high as 12% or 13% of alumina in only about one-half the alumina-depleted fusion, thereby reducing the amount of heat and the size of the equipment necessary to remove the impurities and enrich the fusion. By mixing the high temperature enriched fusion with the other portion of the alumina-depleted fusion, I produce a mixed fusion with the desired percentage of alumina for electrolysis, for example, about 7%, and at a temperature suitable for passage through a carbon filter.

In one aspect of my invention, I calcine the crude bauxite in an operation in which I effect a substantial reduction of iron oxide. For example, I pass into the calciner a reducing gas, such as water gas ($CO+H_2$), to reduce as much of the iron oxide as is commercially feasible. I prefer to do this at temperatures below the melting point of iron so that the reduced iron is in the nature of sponge iron. In view of the pyrophoric character of the reduced iron, I prefer to cool the calcined product under a reducing gas if it should be necessary to expose it to oxidizing conditions as in grinding, handling and the like. In order to facilitate solution of the alumina and separation and sedimentation of the reduced iron, I grind the calcined bauxite to a fine state, say, 100 mesh. I mix powdered or granular aluminum with the ground bauxite, some carbon if necessary, and charge this mixture into the alumina-depleted fusion where the temperature is above the melting point of iron. The aluminum reduces most of the iron oxide remaining in the bauxite, the silica and the titania. The reduced iron, silicon and titanium settle out of the fusion and form an alloy of considerable value. This aspect of my invention gives the significant advantage that the iron oxide is very substantially eliminated before the fusion reaches the filters and the reduction of iron oxide in the filters is greatly minimized.

One of the characteristic features of my invention is the provision of a continuous circuit through an alumina reduction stage, an alumina enriching and oxide reduction stage and one or more filtering stages, in which the fusion is elevated with pump means to obtain a sufficient head for gravity flow, and a bypass circuit for bypassing alumina-depleted fusion from the reduction stage around the oxide reduction stage.

It is advantageous to effect reduction in a sort of smelter provided with means, such as electrodes, for heating to a temperature above the melting point of iron, means for agitating and mixing the fusion, such as a refractory plunger, and a means for settling and separating the reduced metals. At the temperatures I employ in the reduction stage, I can dissolve up to as high as 13% of alumina in the fusion and still have such fluidity that the fusion can be passed through a carbon filter. I may add aluminum to the fusion being agitated and reduced, preferably powdered aluminum or ferro-aluminum, if necessary. Hereinafter, when I refer to the use of aluminum for reducing impurities I include metallic aluminum, such as powdered scrap aluminum or suitable alloys of aluminum such as ferro-aluminum. In this stage I also prefer to effect a reduction of the silica and titania and a separation of the resulting silicon and titanium.

To this end I prefer to utilize the iron, either the reduced iron or added iron, such as powdered iron or the iron of the ferro-aluminum, as a collecting medium for the silicon and titanium. The silicon and titanium alloy with the iron and the resulting alloy is largely separated by settling out of the fusion. When ferro-aluminum is used, the residual ferro-aluminum dissolves silicon and titanium to form an alloy.

The enriched fusion containing up to as high as 13% of alumina and at a high temperature is incorporated in the main stream of alumina-depleted fusion blending the composition and temperature. The enriched fusion may be filtered through a porous carbon filter before or after blending.

My invention provides an improved combination of apparatus advantageously useful in carrying out the method of my invention comprising one or more electrolytic reduction cells, particularly a wedge type cell as described in my copending application Serial No. 673,121, filed May 29, 1946, a smelter for the reduction and separation of iron and other metallic impurities, means for the bypassing of fusion from the reduction cells around the smelter, filters for the removal of impurities, and pump means, one for drawing fusion from the electrolytic reduction cell and flowing it through the smelter and another for elevating the fusion to effect its flow through the final stages of filtering and back into the electrolytic reduction cells.

Figure 2:
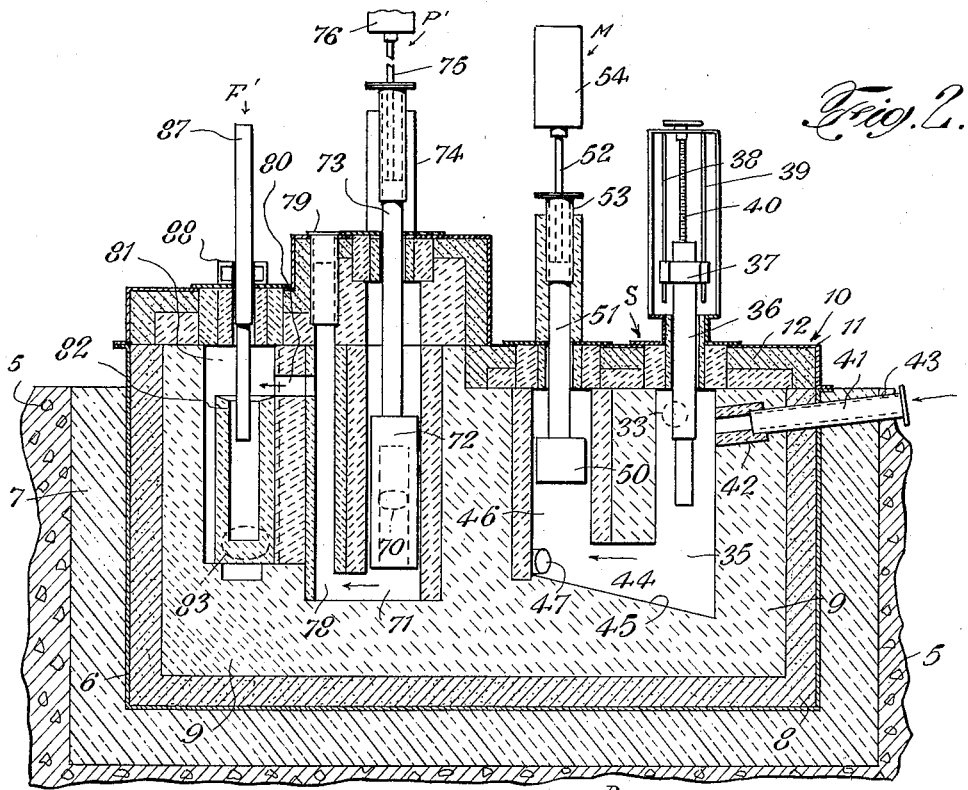
Figure 3:
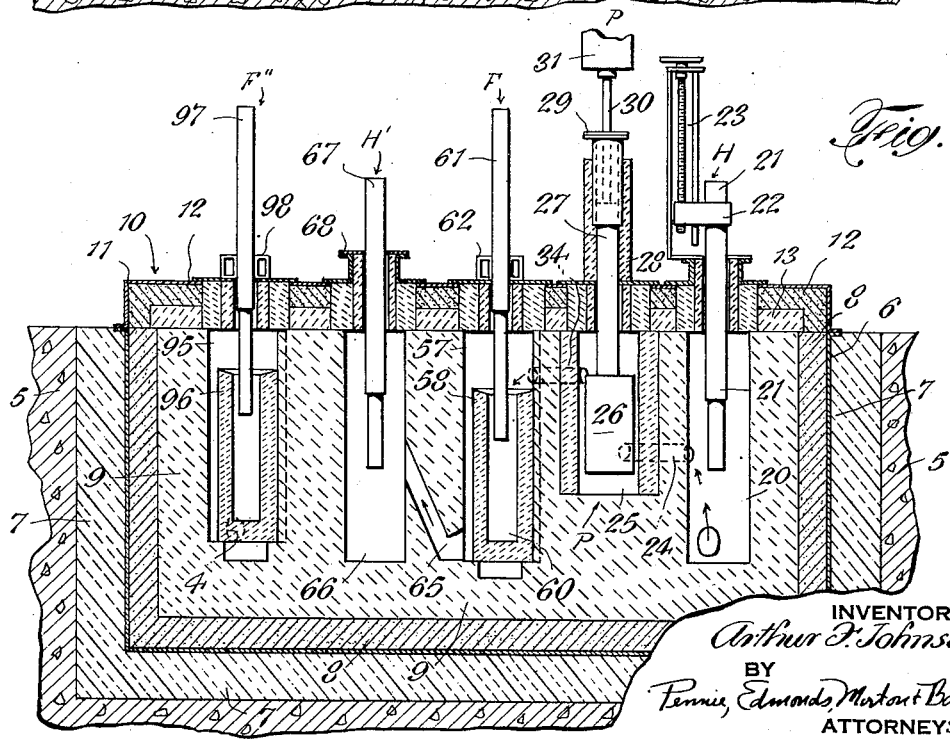

These and other novel features of the invention will be better understood after considering the following discussion taken in conjunction with the accompanying drawings, in which:

Fig. 1 is a plan view of apparatus embodying my invention;

Figs. 2 and 3 are sectional views along lines 2—2 and 3—3, respectively, of Fig. 1, and Fig. 4 is a vertical sectional flow view at the planes indicated in Fig. 1.

The apparatus illustrated in the drawings comprises two main parts in combination—an electrolytic cell 1, one end portion of which is shown, and a feeding and purifying apparatus 2. Alumina-depleted fusion from the cell flows into the purifying apparatus through the duct 3 and the alumina-enriched fusion in the purifying apparatus returns to the cell through the duct 4. For matters of economy in the saving of heat, I prefer to install both the electrolytic cell and the purifying apparatus in the earth with the upper surface approximately at floor level. I may use concrete lining in contact with the earth and insert inside of the concrete lining 5 a steel shell 6, the purpose of which is to prevent moisture from entering the inside of the apparatus. The space between the concrete lining and the shell 6 is filled wtih rammed alumina 7 to serve as a thermal insulation. Inside the steel shell 6, a layer of porous carbon 8 is applied as thermal insulation. The entire inside of the apparatus within the porous carbon lining including all of the ducts and chambers is formed of carbon pot lining 9 which is the material usually used for contacting cryolite fusions of alumina.

A removable cover 10 rests upon the upper flat surface of the apparatus previously described. The cover comprises a steel shell 11 with an exterior layer of porous carbon 12 and an interior layer of pot lining 13.

The ducts 3 and 4 are formed within bodies of pot lining 14 and 15 extending from the refining apparatus into the electrolytic cell. In order to prevent a short circuit of current through from the electrolytic cell into the purifying apparatus, the ducts 3 and 4 pass through electrical insulating blocks 16 and 17 formed of a material such as dense fused aluminum nitride brick prepared as described in my copending application Serial Number 634,145.

Duct 3 connects with a heater H comprising a cylindrical upright chamber 20 and a depending electrode 21 of graphite mounted in the holder 22 which is attached to a threaded member 23 by means of which the electrode may be lifted or depressed to regulate the electrical energy input. This electrode is used only when the fusion from the reduction cell is not sufficiently hot, say, below 950° C. The electrode is preferably connected to alternating current.

Chamber 20 connects by duct 24 with a pump P which comprises an upright cylindrical space 25 in which is mounted a loose fitting cylindrical carbon plunger 26 mounted on the shaft 27. This shaft is mounted within a sleeve 28 attached to the cover 10 and in the upper end a stuffing box 29 is mounted through which the metal shaft 30 embedded in the carbon shaft 27 connects to a piston, not shown, operating in the cylinder 31. The pump, accordingly, comprises a refractory piston, a refractory stem operating in a refractory cylinder, a stuffing box providing a gas-tight connection for the stem, and the steel shaft connected thereto which operates in the cylinder 31. In order to regulate the flow of fusion into and out of the cylinder 25 a refractory plug 32 is adjustably positioned within the duct 24. The fusion is, accordingly, sucked through duct 3 and, by reason of plug 32, forced to flow out through two ducts, one duct 33 which leads to the smelter S and the other 34 which leads to the filter F. The smelter S comprises an upright cylindrical chamber 35 and a depending electrode 36 preferably formed of graphite. This electrode is suspended in the holder 37 slidably mounted in the guide rods 38 and 39 and which is adjusted in its upward or downward position by the screw 40 to regulate energy input. The downwardly sloping feed duct 41 extending from a hopper or other suitable storage space, not shown, enters the chamber 35 for the introduction of calcined crude bauxite and reducing agent into the chamber. The duct 41 comprises an electrically non-conducting sleeve of fused alumina 42 and a steel sleeve 43 in which is mounted a worm or other mechanical feeding device, not shown. Both the feed duct 41 and the duct 33 enter the cylinder 35 near the top. The bottom portion of the cylinder 35 is contiguous with a lateral chamber 44 which has an inclined bottom 45 sloping into the chamber 35. The chamber 44 is also contiguous with an upright cylindrical chamber 46 which has a duct 47 leading into the filter F. The cylinder 46 is part of a mixer M comprising a carbon plunger 50 mounted on a carbon shaft 51, the upper end of which is attached to a steel piston rod 52 which passes through the stuffing box 53 and is connected to a piston, not shown, in the cylinder 54.

The duct 47 slopes upwardly to the top of the refining apparatus and is a means by which access may be had to the interior of the mixer M. The top is closed with a plate 55. The lateral duct 34 enters the first filter F comprising an upright cylinder 57 in which is mounted a hollow cylindrical porous carbon filter 58 in the form of a vessel. The filter 58 is positioned to receive fusion overflowing from duct 47. The graphite heating electrode 61 is supported in a holder similar to that for electrode 21 and passes through the gas-tight stuffing box 62 in the cover 10. The bypass duct 34 connects the cylindrical space 26 of pump P with the cylindrical space 57 of the filter. The fusion pumped out of space 26 flows in part through duct 33 into the smelter S and in part through duct 34 into the filter F. It is sometimes advantageous to use the electrode 61 to increase the temperature of the fusion to facilitate filtering. Preferably the mixed fusion is filtered at a temperature of about 1200° C.

The mixed fusion enters the duct 65 and flows into the heater H'. This heater comprises an upright cylindrical chamber 66 in which the depending graphite electrode 67 is mounted. This electrode passes through a gas-tight gland 68 and is supported in a holder similar to the holder for electrode 21 and may be adjusted upward and downward by that apparatus.

That portion of the cover which surrounds pump P' and filter F" is somewhat elevated to provide for the relatively long length of stroke used in the piston of that pump and also to facilitate removal of the pump.

The fusion from heater H' flows through duct 70 into the mid-portion of cylindrical space 71 of pump P'. The carbon piston 72 attached to the carbon rod 73 is reciprocable in its cylinder. The rod 73 passes out through the stuffing box 74 which is gas tight and the steel piston rod 75 is threaded into the rod 73. The piston rod 75 enters the cylinder 76 in which a piston (not shown) on the rod 75, with a relatively long stroke, operates piston 72. The carbon plunger or valve 77 is adjustably mounted in the duct 70 to regulate the flow therethrough. The bottom of cylinder 71 is connected to the upright duct 78 extending through to the top of the cover, the upper end of which is closed by the lid 79. The lateral duct 80 connects to the upright cylindrical space 81 of the filter F'. This filter comprises a hollow cylindrical porous carbon filter 82 which is positioned to receive fusion overflowing from the duct 80. The fusion that passes through the filter enters the duct 83 at the bottom and flows upwardly until it meets the lateral duct 84 which enters the upright cylindrical space 85 of the filter F". The duct 83 extends to the top of the cover for cleanout purposes and is protected from the atmosphere by the removable lid 86. Fusion in the filter F" is heated by the graphite electrode 87 which passes through the gas-tight stuffing box 88 and is adjustably supported by a holder similar to that for electrode 21.

In the upright cylindrical space 85 of the filter F" is mounted the hollow porous carbon cylinder 96. Duct 84 is arranged to discharge fusion into the hollow center of cylinder 96 and the fusion which passes therethrough enters the upwardly inclined duct 4 and returns to the electrolytic cell 1. The fusion in filter F" may also be heated when required with an electrode 97 which passes through the gas-tight gland 98 to a suitable adjustable holder such as that for electrode 21. The refining apparatus and electrolytic cell are so arranged that the normal level of fusion in the cell where it returns through duct 4 is about 15 inches below the top of the cell, whereas the fusion in the cell where it enters duct 3 is about 19 inches below the top of the cell. This gives a head of 4 inches which induces a rapid flow of fusion through the cell and into duct 3. The major portion of the pumping is preferably done by pump P'. Both of these pumps operate on the principle that the valve plugs 32 and 77 offer such resistance to the flow of fusion that it is easier for the fusion to flow in the direction of the arrows than to flow in the reverse direction in any objectionable amount.

The various heating electrodes comprise a relatively large diameter portion which is held by the holders and a relatively small diameter portion which enters the fusion. This provides an electrode with low lead-in heat loss and a small diameter part of higher resistance for heating the fusion. The stuffing boxes are preferably all alike and are sufficiently tight to prevent objectionable gas leakage. They may be stuffed with asbestos or metal packing. The pistons 26, 50 and 72 and their connected stems 27, 51 and 73 are made of carbon having high strength and relatively low heat conductivity so that the steel shafts connected thereto will not become overheated.

The carbon filters may be of any suitable construction such as packed granular carbon or porous carbon. As illustrated, the filters are formed cylindrical vessels of porous carbon. Since most of the iron, silicon and titanium are removed before the fusion leaves the smelter, the filters are not unduly burdened with the reduction of iron oxide or with the trapping of particles of reduced metals. The filters serve the important function of chemical scrubbers for the reduction of iron oxide to low percentages and the holding of the reduced iron in the pores.

The various heating electrodes are provided more or less for emergency uses, such as when portions of the circuit in the purifying apparatus need supplemental heat.

The alloy which accumulates on the bottom 44 may be removed by lifting off the electrode unit 36 and freezing the alloy on a lifting member, as described in my copending application Serial Number 685,695, filed July 23, 1946.

The fusions undergoing treatment contain alumina dissolved in cryolite as is usual in the Hall process. Frequently other salts are added to the fusion to lower the melting point and to increase the solubility of alumina, such as other fluorides, especially fluorspar.

I claim:

1. In the electrolytic reduction of alumina from cryolite-containing fusions of alumina, the improvement which comprises withdrawing alumina-depleted fusion from the electrolytic reduction operation, adding crude bauxite containing oxidic impurities including iron oxide to a portion of the withdrawn alumina-depleted fusion in amount sufficient to bring the alumina content of that portion of the withdrawn fusion up to as high as 13%, heating the enriched fusion in contact with a reducing agent from the class consisting of aluminum, aluminum alloys and carbon to reduce the iron oxide to iron while at a temperature above the melting point of the reduced iron, separating molten iron from the fusion, mixing the alumina-enriched fusion from which the molten iron was separated with another portion of the withdrawn alumina-depleted fusion, said another portion of the withdrawn alumina-depleted fusion being in amount sufficient to produce a resultant fusion having an alumina content of about 7%, passing the latter fusion through a carbon filter and back into the electrolytic reduction operation.

2. The improvement in the electrolytic reduction of aluminum from cryolite-containing fusions of alumina set forth in claim 1 in which the resultant fusion is passed through the carbon filter while at a temperature of about 1200° C.

3. The improvement in the electrolytic reduction of aluminum from cryolite-containing fusions of alumina set forth in claim 1 in which the reducing agent is aluminum.

4. The improvement in the electrolytic reduction of aluminum from cryolite-containing fusions of alumina set forth in claim 1 in which the amount of crude bauxite which is added to the first-mentioned portion of the withdrawn alumina-depleted fusion is in amount sufficient to increase the alumina content thereof to about 12%.

ARTHUR F. JOHNSON.

REFERENCES CITED

The following references are of record in the file of this patent:

UNITED STATES PATENTS

| Number | Name | Date |
|---|---|---|
| 715,625 | Taddei | Dec. 9, 1902 |
| 1,643,610 | Rosenzweig | Sept. 27, 1927 |
| 1,851,817 | Dow | Mar. 29, 1932 |
| 2,162,942 | Rohden | June 20, 1939 |
| 2,373,320 | Lovell | Apr. 10, 1945 |

FOREIGN PATENTS

| Number | Country | Date |
|---|---|---|
| 520,851 | Germany | Mar. 14, 1931 |